United States Patent [19]

Geschwender et al.

[11] Patent Number: 5,038,606

[45] Date of Patent: Aug. 13, 1991

[54] RAIN GAUGE

[75] Inventors: Robert C. Geschwender; George W. Peterson, both of Lincoln, Nebr.

[73] Assignee: Concept Engineering, Inc., Lincoln, Nebr.

[21] Appl. No.: 385,903

[22] Filed: Jul. 27, 1989

[51] Int. Cl.$^5$ ............................................. G01W 1/14
[52] U.S. Cl. ......................................... 73/171; 73/427
[58] Field of Search ................. 73/171, 426, 427, 428, 73/294, 323, 324, 325, 326, 327, 328

[56] References Cited

U.S. PATENT DOCUMENTS

| | | | |
|---|---|---|---|
| 756,109 | 3/1904 | Friez | 73/171 |
| 1,407,068 | 2/1922 | Johnson | 73/171 |
| 2,509,522 | 5/1950 | Phillips | 73/171 |
| 2,513,605 | 7/1950 | Vernon | 73/171 |
| 2,821,852 | 2/1958 | Hastings | 73/171 |
| 4,233,841 | 11/1980 | Abele | 73/171 |

FOREIGN PATENT DOCUMENTS 2247848 4/1974 Fed. Rep. of Germany ........ 73/171

Primary Examiner—Donald O. Woodiel
Attorney, Agent, or Firm—Vincent L. Carney

[57] ABSTRACT

To permit easy reading of the rainfall at a distance, an intercepting means on a rain gauge intercepts rain falling through a larger area than the upper surface area of the rain water within the container of the rain gauge. A colored float points to rainfall markers on an expanded scale along the container so that if rain is indicated in inches, the indicia means has its inch marks spaced vertically to correlate with the float at distances larger than inches.

20 Claims, 3 Drawing Sheets

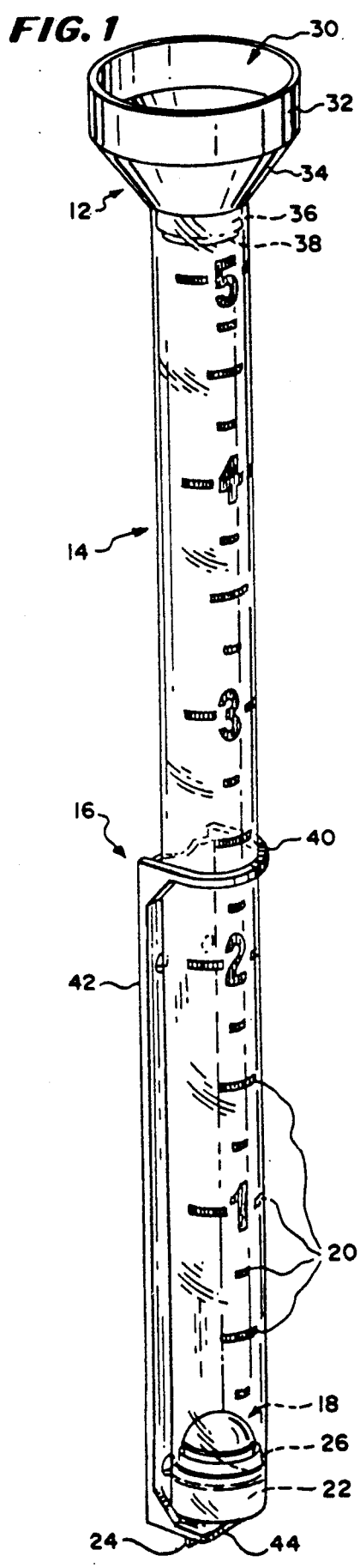
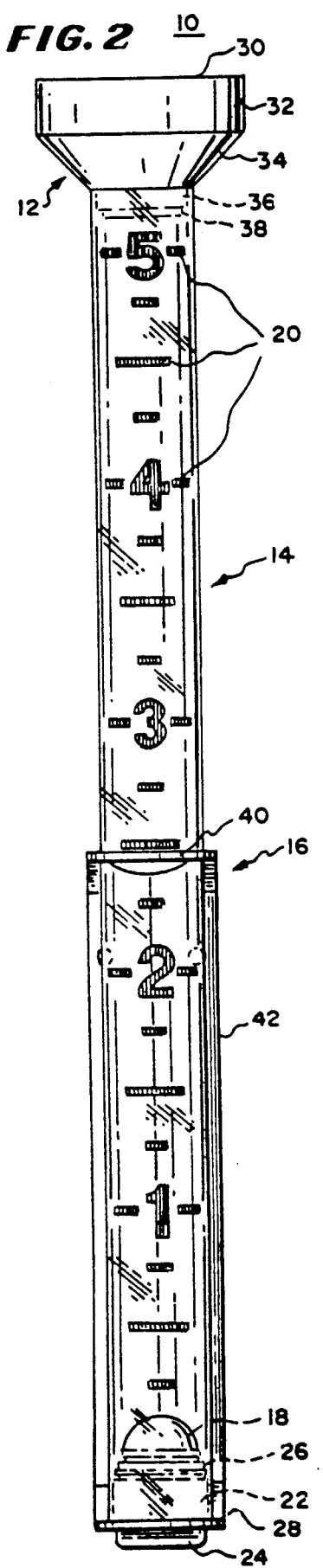
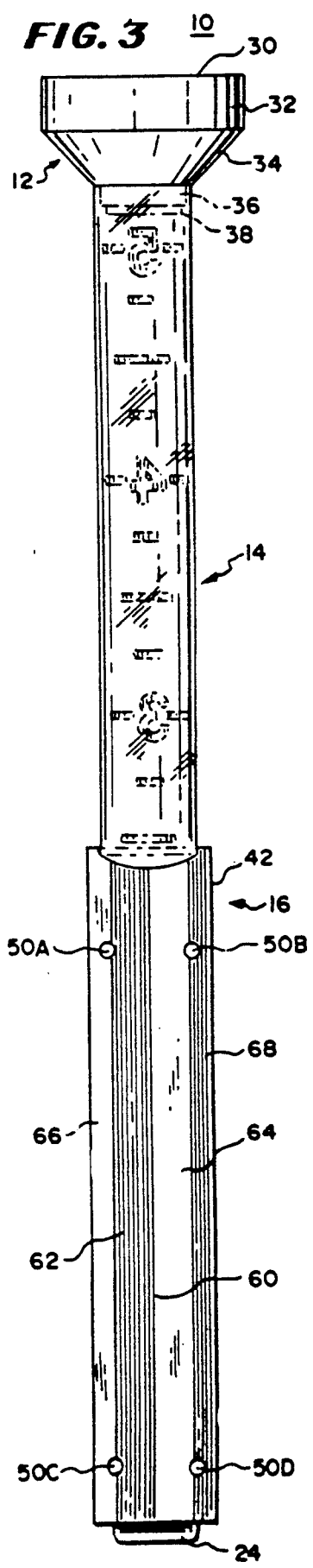

RAIN GAUGE

BACKGROUND OF THE INVENTION

This invention relates to gauges for measuring rain.

One class of rain gauges includes a transparent tube capable of holding water within it, having a floatable object inside of it and an open top to collect rain as the rain falls. Such rain gauges have marks extending vertically along the lateral surface of the transparent tube indicating the inches of rain and fractions of inches of rain so that as the floatable object rises, it indicates a mark showing the amount of rain that has fallen. Of course, units other than inches are used where appropriate such as millimeters or the like but inches will be referred to in this specification as an example.

A prior art rain gauge of this class has an opening which has the same diameter as the inner diameter of the tube. This inner diameter is constant throughout the height of the tube. The tube collects rain falling through a horizontal area equal to the cross-sectional area of the tube opening so that when an inch of rain has fallen the water in the tube rises one inch. Thus, the vertical marks indicating inches of rain spaced vertically along the tube are directly to scale.

This prior art type of rain gauge has a disadvantage in that it is difficult to read the scale along the vertical wall of the rain gauge because it is so small. Moreover, many rain gauges of this type are relatively complicated in construction and are expensive.

SUMMARY OF THE INVENTION

Accordingly, it is an object of the invention to provide a novel rain gauge.

It is a further object of the invention to provide a novel technique for measuring rain.

It is a still further object of the invention to provide an easy-to-read rain gauge.

It is a still further object of the invention to provide a rain gauge which has indicia marked upon it so clearly that the amount of rain that has fallen may be read from a considerable distance.

In accordance with the above and further objects of the invention, a rain gauge includes a container for holding rain, a float adapted to be positioned within the container and be lifted by the rain water within the container, an intercepting means for intercepting rain falling through a predetermined area and applying it to the container, and indicia means that cooperates with the float to indicate the amount of rain that has fallen. The container, float, intercepting means and indicia means are arranged to provide an indication of the amount of rain that has fallen which can be seen from a substantial distance such as in a range of between 50 feet and 200 feet away and be easily read from that distance by a person with normal 20/20 vision.

To permit easy reading of the rainfall at a distance, the intercepting means intercepts rain falling through a larger area than the upper surface area of the rain water within the container that supports the float and the indicia means includes an expanded scale so that if rain is indicated in inches, the indicia means has its inch marks spaced vertically to correlate with the float at distances larger than inches. The scale of the indicia includes dimension marks that are spaced apart a distance equal to the corresponding dimensional units of the amount of rain that has fallen multiplied by a whole number or a fraction so that for example the scale is a multiple of the actual dimensions of rain. The numerals or letters indicating the amount of rain that has fallen are at least ¼ inch in height and at least 3/16 inch in width with the lines forming the individual digits being at least 1/16 inch wide to provide clear visibility.

The rain gauge has a larger than standard scale with a funnel type interface rain collector which has an opening cross-sectional area larger than the cross-sectional area of the gauge. The ratio of the cross-sectional area of the interface to that of the cross-sectional area of the gauge is directly proportional to the size of the large scale to that of a standard scale and a float type indicator is within the gauge and improves the readability of the gauge at a distance. A mounting bracket allows easy removal of the gauge for dumping water collected and when reinstalled orients the scale for proper viewing.

In the preferred embodiment, the container has a tubular side wall that is transparent or translucent, a bottom that is a separately formed insert for the tubular side wall and receives a float sized to close the side walls but be movable therein. The side wall has numerals extending vertically along its surfaces to form a scale running from 1 to a higher number such as 5 clearly marked in luminous or colored paint with division lines between them to indicate inches. However, the inch marks are spaced much further from each other than the actual distance in inches that are indicated by the numbers.

The intercept means fits in the top of the tube and has openings extending into the tube, being funnel shaped so that its bottom fits into the container but its top has a diameter larger than the container to collect rain. The proportions are such that an inch of rain falling into the intercept means will cause the float to be lifted to the "1" inch mark even though the marks are further apart than an inch because the diameter of the container is smaller than the diameter of the upward receiving end of the funnel-shaped intercept means.

The lower end of the funnel-shaped intercept means fits within the cylindrical tubular container and contains a separating wall with holes to permit water to flow from the funnel into the tube without receiving debris or the like. Advantageously, there are several holes, some of which are larger than others to permit the easy escape of air. The upper end of the funnel is cylindrical and adapted to lie in a plane orthogonal to the longitudinal axis of the container.

For convenient mounting, the bottom plug of the container contains a downwardly extending blade which fits within a bottom ear of a bracket. An upper loop on the bracket fits over the tube conformingly and along the rear surface of the bracket there are apertures for fasteners or the like.

With this arrangement, the container may slide downwardly through the upper loop until the blade engages the lower ear of the bracket and the indicia face outwardly from the bracket so that it is held securely in place with the indicia positioned for easy reading. The funnel intercept means may then be positioned in the open end capturing the float within the container. The parts are economically formed by extruding and molding. Moreover, they may be assembled by snapping together without gluing if desired.

As can be understood from the above summary, the rain gauge of this invention has several advantages, such as: (1) it is easy to read from a distance; and (2) it is inexpensive to fabricate and assemble.

SUMMARY OF THE DRAWINGS

The above-noted and other features of the invention will be better understood from the following detailed description when considered with reference to the accompanying drawings in which:

FIG. 1 is a perspective view of the rain gauge;

FIG. 2 is a front elevational view of the rain gauge of FIG. 1;

FIG. 3 is a rear elevational view of the rain gauge of FIG. 1;

DETAILED DESCRIPTION

Figure 4:
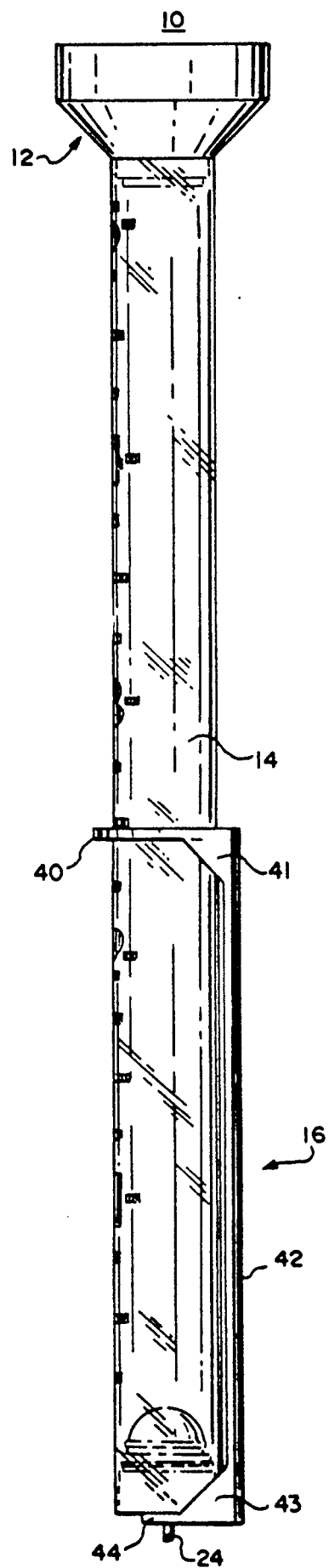
FIG. 4 is a side elevational view of the rain gauge of FIG. 1.

Throughout this specification, the amount of rain that has fallen is indicated in a conventional manner by a number representing the height of water in inches in a container which water would be collected if the falling rain were captured in the container in such a way as to represent an average of the rain falling over a large area. It is assumed that the container capturing the rain is positioned so that the rain hitting the container represents a cross-section of the rain orthogonal to its path which in the case of a windless day would be a horizontal opening for a container positioned to receive vertically falling rain and having perfectly vertical sides and a horizontal bottom to faithfully represent the amount of rain that is falling. This number reflects the volume per square inch of rain that has fallen and is normally used in reporting on the amount of rainfall. The number may be in any convenient unit such as inches or millimeters or the like.

In FIG. 1, there is shown a perspective view of rain gauge 10 having an interface means 12, a container or body means 14, a mounting bracket 16, and a float 18. The container means 14 has its open end upward where it receives interface means 12 and contains the float 18 within it so that rain being intercepted by the interface means 12 flows into the container or body means 14 and causes the float 18 to rise in proportion to the amount of rain which has fallen and been received by the interface means 12. The interface means 12, container or body means 14, and float 18 are arranged to be supported by the mounting bracket 16 on a wall or fence or the like.

The mounting bracket 16 is optional but is an inexpensive convenient bracket for properly mounting the rain gauge 10. The container or body means 14 includes a plurality of indicia or markers which extend vertically upwardly and are indicated generally at 20 for convenience. The indicia or markers 20 are positioned so that as the float 18 is lifted, the marks opposite the float 18 indicate the amount of rain that has fallen.

The container or body means 14 has a watertight bottom and sides to contain rain water and is sized and shaped to cooperate with the float 18, interface means 12 and indicia or markers 20 for indicating the amount of rain. However, they indicate the amount of rain in a manner that can be read more clearly than in a conventional rain gauge because: (1) they permit the float 18 to reach a level which is proportional to the amount of rain but greater than the height of rain water collected in a conventional rain gauge or the amount of rain in a flat uniform container; (2) they are adapted so that the interface means 12 receives an amount of water proportional to the rain and causes it to flow into the container; (3) the amount of rain water in the container reaches a level greater than it would in a standard rain gauge or in a container not having the interface means; (4) the indicia are larger and spaced further apart than in a normal rain gauge and the space between each pair of numbers comprising the indicia indicating the height of rain is greater than the difference between the amount indicated by the corresponding pair of numbers; and (5) the float provides a more visible indication of the level of the top of the rain water than only the air-water interface.

The mounting bracket 16: (1) is able to support the container or body means 14; (2) easily receives the container or body means 14 and holds it in an aligned position; (3) is inexpensive; (4) contains an interlock means which causes the indicia or markers 20 to face forwardly when the container is received by the mounting bracket 16; and (5) permits easy removal of the container 14 for emptying and replacement.

In the preferred embodiment, the container or body means 14 is a cylindrical transparent tube of ultraviolet light resistant butyrate open at both ends. It has a circular wall approximately 1/32 of an inch thick with an inner tubular diameter of 1¾ inches and is 24 inches long. It is closed at its bottom end by a separately molded plastic plug 22 having an outwardly extending ridge and a collar which fits inside the tube to form a sealed container.

While the container or body means 14 is made in two parts, the tubular cylindrical transparent plastic tube and the bottom closing plug 22, it could be made as one piece although there are cost advantages to making the two items separately. Moreover, it need not be cylindrical nor of any specific diameter or length except that it must be sized in relation to the inlet of the interface means 12 and the indicia or markers 20 so that as the float 18 is lifted, an indication is made on the indicia or markers 20 of the correct amount of rainfall.

Preferably, the inner diameter of the tube is smaller by a fixed constant amount than the diameter of the interface opening so that the indicia or markers 20 may be spaced from each other regular distances for equal units of rain height. However, the diameter may vary along the height of the container provided the indicia are adjusted to reflect the proper rainfall. While a butyrate tube is used in the preferred embodiment for the container, any other suitable transparent material may be used including other plastics and glass. The indicia are spaced from each other by an amount larger than actual height of rainfall and proportionally to the amount of rainfall. The scaling factor (proportionality constant) of the indicia to the actual amount of rainfall is equal to the ratio of the cross-sectional area of the opening of the interface means to the area of the container.

The float 18 responds to the volume of liquid deposited in the container or body means 14. Because the height of the liquid in the container or body means 14 multiplied by its cross-sectional area is equal to the volume, the area must be less than the area of the collector by the same factor that the units of height of rain such as inches are to be multiplied to provide the enlarged scale. Thus, if the scale is to be double the amount of actual rainfall, the inner cross-sectional area of the container or body means 14 must be one-half the area of the inlet and of the interface means 12 which receives the rain. Since both are circular or cylindrical in the preferred embodiment, this scaling factor is the ratio or the square of the diameters so that, for example, the diameter of the container is one-fourth the diameter of the inlet of the interface means 12 if the scale factor by which the indicia are increased is 16.

In the preferred embodiment, the plug has an outer diameter substantially equal to the inner diameter of the cylindrical tube and has a annular bottom ledge supporting a gasket at the bottom, with the annular ledge being 1/32 inch and flush with the outer wall, thus permitting the plug to be tightly inserted with its downward by extending parallelopiped blade being aligned with a corresponding slot in the bracket when the indicia or markers 20 face in the desired direction.

In the preferred embodiment, the indicia or markers 20 are printed onto the outer surface of the cylindrical tube, being scaled in inches 4⅜ inches apart so that the vertical distance between the one inch indicia and the two inch indicia is 4⅜ inches. Similarly, the difference between each of the other indicia or markers 20 is 4⅜ inches. Of course, any other distance can be established by changing the ratio of the diameters of the interface means 12 of the collector and the inner diameter of the tube.

The size of the letters in the preferred embodiment are a full inch in height and approximately ⅜ inch in width with the lines making up the individual digits being ¼ inch wide to provide clear visibility. Intermediate between adjacent digits at 2 3/16 inches apart are 1 inch marks and ¼ inch marks are spaced at distances of 1 3/32 inch from the adjacent ½ mark and inch mark.

While in the preferred embodiment, the scale inch designations for the rain that has fallen are printed or painted in color directly onto the transparent tube, they may be mounted separately adjacent to the tube or the float 18 may move a pointer, which pointer is separate from the float 18, extends out of the tube and is mounted to move with the float 18 so to point at a location on another scale. Moreover, the float 18 may remotely move or activate another meter to indicate the amount of rain such as by magnetism. However, the use of a float which serves as a pointer to indicate dimensions painted directly on the cylindrical tube has the advantage of simplicity and low cost.

In the embodiment of FIG. 1, the float 18 is a substantially cylindrical plastic hollow ball, half of which is of one color and half of which is in another color so that the dividing line between the colors serves as a marker. At the line that divides the two colors, there is a slightly outwardly extending annular ledge for the purpose of maintaining orientation of the ball as it floats upwardly and there is a difference in weight so that the same end always floats upwardly. The outer diameter of the annular ledge is substantially equal to the inner diameter of the container or body means 14 but is sized to have slight tolerance such as ¼ inch less in diameter to permit free floating upwardly and downwardly in the container. This clearance should at least be 1/32 inch to be free to move even though there are differences in the expansion caused by differences in temperatures.

In the preferred embodiment, the interface means 12 serves as an initial collector of the rain and includes a circular upper top interface opening 30 having an area equal to the cross-sectional area of the container or body means 14 multiplied by the scaling factor for the indicia or markers 20 on the container or body means 14. Both the distance between inch marks or other indicia and the diameter of the container are constant throughout the height of the container and the interface opening 30 of the interface means 12 is constant in all embodiments, but in other embodiments it is possible to change the diameter of the container or body means 14 and the corresponding scaling factor.

With the scaling factor changed and the ratio of the areas of the container or body means 14 and the interface opening 30 changed, for example, a narrow diameter is at the bottom of the container 14 for the gradations between 0 and 1 inch to provide a larger scaling factor such as a scaling factor of 12 with a area of the container 14 being 1/12 the area of the interface opening 30 and then at a higher location, such as for example, starting at 1 inch, the area of the container 14 is larger for indicia that are correspondingly closer together, such as for example, with a cross-sectional area six times the area of the interface opening 30 to the interface means 12, the scaling factor is only six.

In the preferred embodiment, the interface opening 30 is circular and has a diameter of approximately 3 11/16 inches and the diameter of the container tube is approximately 1¾ inches to provide an approximate scaling factor of 4⅜. Between the interface opening 30 and the bottom of the interface means 12 which fits within the inner diameter of the container or body means 14 is a first cylindrical tubular member 32, a second frusto conical member 34 which slopes inwardly in a funnel like manner, a third lower smaller diameter cylindrical member 36 sized to fit within the inner diameter of the container or body means 14 and a final terminating cylinder 38 that is slightly smaller than the third smaller diameter cylindrical member 36.

With this arrangement, the funnel-shaped interface means 12 is firmly mounted in sealing relationship to the wall of the container or body means 14 and depends downwardly into it for the relatively smooth flow of rain water into the container or body means 14. It is made of high impact plastic of any suitable type and has a general wall thickness of approximately 1/16 inch. The first cylindrical tubular member 32 has a height of approximately 1 inch, the second frusto conical member 34 has a vertical dimension of approximately 1 inch and extends at an angle of 45 degrees from the vertical to the third cylindrical member 36. The third cylindrical member 36 has a length of approximately ⅝ of an inch and terminates at an inwardly extending shoulder extending approximately 1/64 inch inwardly to the final terminating cylinder 38. The final terminating cylinder 38 is approximately ¼ inch in length.

In the preferred embodiment, the interface means 12 may be inserted into the container or body means 14 with a press fit manually but could be sealed by adhesive or formed directly on it in other embodiments. The press fit of course has some advantages in fabrication cost.

In the preferred embodiment, the bracket 16 has an upper holding end 40, a centrally located mounting section 42 and a lower supporting end 44. It consists substantially as an L-shaped plate having a substantially flat back, a loop 40 at one end of the back intended to pass around the outer circumference of the container or body means 14 to form the holding end 40 and a flat outwardly horizontally holding end 44 at the other end that supports the container or body means 14 from the bottom to form the supporting end.

The holding end 40 is sized so that the container or body means 14 may slide downwardly into it and extend to the supporting end 44 where an outwardly extending ear 24 on the plastic plug 22 fits within a slot of the plug 22 extending outwardly for alignment and holding purposes while the flat surface of the plastic plug 22 rests on the supporting end 44. The mounting section 42 contains apertures for fastener means to be permitted to be screw mounted to a flat surface for easy viewing.

In FIG. 2, there is shown a front elevational view of the rain gauge 10 illustrating the alignment of the indicia 20 forwardly, so that as the float 18 moves upwardly, it can be seen through the holding end 40 and above the support end 28 of the bracket 16, with the mounting section 42 firmly holding the container or body means 14 in a vertical upright position. The downwardly extending ear 24 extends through a slot to align the indicia forwardly of the mounting bracket 16 by means of having it aligned with the indicia 20 so that when inserted in the slot, the indicia 20 face forward.

In FIG. 3, there is shown a rear elevational view of the mounting bracket 16 showing apertures 50A, 50B, 50C and 50D spaced along the mounting section 42 at raised vertical edges for mounting, such as by woodscrew to a garage. The raised edges are formed by portions of the supporting section 42 that are at slight angles to each other. Two such portions 62 and 64 meet to form a vertical center edge 60 extending against the container or body means 14. The other edges of the two portions 62 and 64 are nearest to the surface where the bracket 16 is to be mounted where they meet the outer vertical portions 66 and 68 that extend forwardly in the direction of the container or body means 14 so that the apertures 50A, 50B, 50C, and 50D are spaced furthest away from the container or body means 14 and the container or body means 14 only engages generally one vertical line of the bracket in the mounting section 42.

In FIG. 4, there is shown a side elevational view of the rain gauge 10 illustrating the holding end 40 extending horizontally outwardly from the mounting section 42 and connected thereto by corner supports 41 at the top. The bottom supporting end section 44 receives the downwardly extending ear 24 through its slot and provides a horizontal support for the weight of the rain by having a supporting corner 43 for additional strength.

Figure 5:
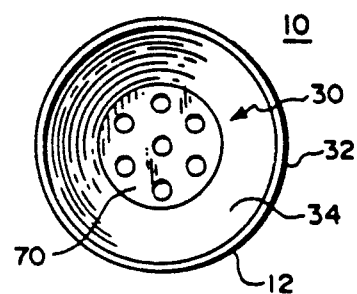
FIG. 5 is a plan view of the rain gauge of FIG. 1.

In FIG. 5, there is shown a top view of one embodiment of the rain gauge 10 having the interface means 12, and showing the inner slanting surface to a flat separating area 70 at the bottom of the frustro truncated section 34 and spaced from the first cylindrical section 32. This horizontal section includes seven holes which permit rain water to flow downwardly into the container or body means 14 (FIGS. 1-4) while blocking debris from falling therethrough. The frustro truncated section 34 and the first cylindrical section 32 are sufficient in length to provide a holding volume capable of holding a heavy rain without loosing rain water while it flows through the smaller apertures.

Figure 6:
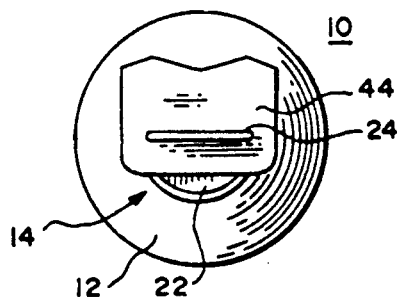
FIG. 6 is bottom view of the rain gauge of FIG. 1.

In FIG. 6, there is shown a bottom view of one embodiment of rain gauge 10 having a bottom supporting end 44 shown broken away with the downwardly extending container or body means 14 having an end plug 22 formed of plastic and a funnel 12. The blade 24 of the plug 22 extends through a slot in the bottom supporting end 44 to align and hold the container or body means 14.

Figure 7:
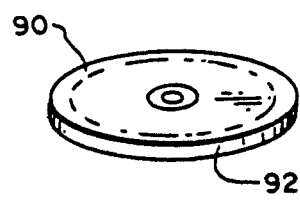
FIG. 7 is a perspective view of another embodiment of a portion of a rain gauge.

In FIG. 7, there is shown another embodiment of float 90 similar to the float 18 but shaped as a floatable disk having an outer diameter of substantially the same size as the inner diameter of the container or body means 14. This disk shaped float 90 is of a single color to better indicate the rain level. However, the edge 92 may be of a distinctly different color than the side such as being red or yellow with a green upper surface or a white upper surface.

Figure 8:
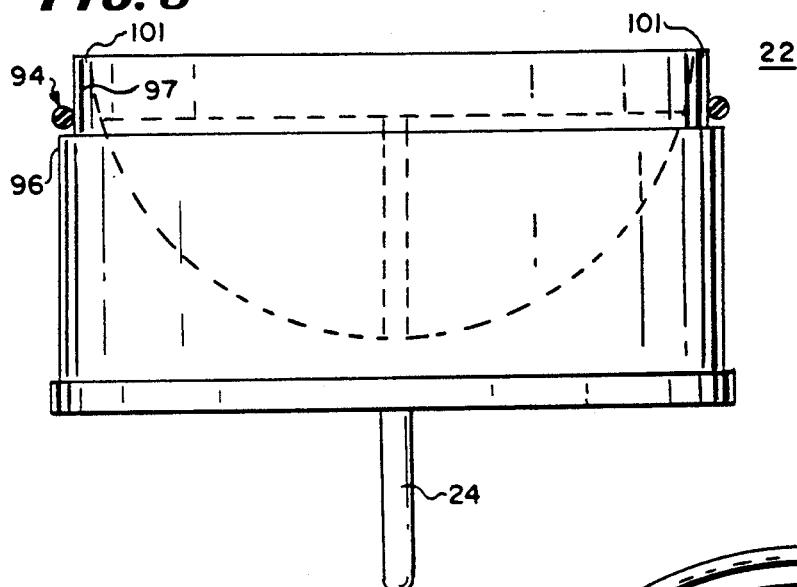
FIG. 8 is an elevational view of another portion of a rain gauge.

In FIG. 8, there is shown an enlarged elevational view of the closure or plug 22 having a shoulder on the side further away from the blade 24 with a single "O" ring 94 in its side resting against the shoulder to provide a better seal while permitting the plug 22 to fit within the tube.

Figure 9:
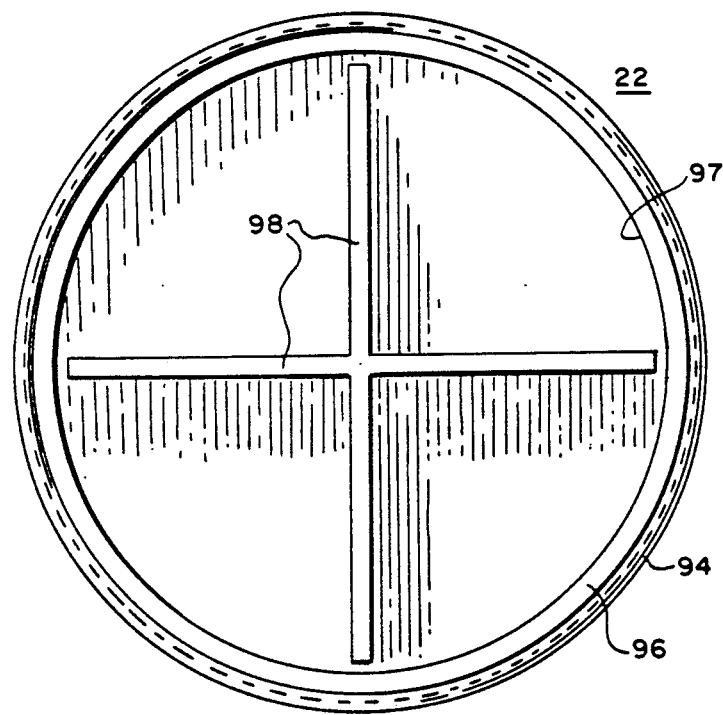
FIG. 9 is a plan view of a portion of the embodiment of rain gauge of FIG. 1.

In FIG. 9, there is shown a plan view of the closure or plug 22 having an upwardly extending cylindrical wall 96, the "O" ring 94 and a relatively flat bottom with a raised cross shaped section 98 that extends to 3/16 of the top 101 (FIG. 8) of the inner wall 97 for lifting the float 90 (FIG. 7) to permit rain water to flow thereunder for lifting it. Otherwise, it is flat in the bottom to indicate zero when there is no rain.

Figure 10:
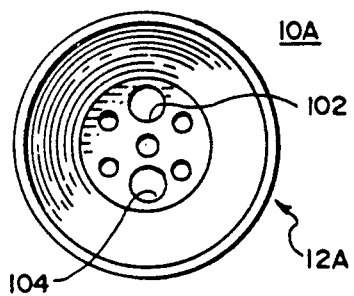
FIG. 10 is a plan view of another embodiment of rain gauge.

In FIG. 10, there is shown a plan view of another embodiment of rain gauge 10A having a slightly different interface means which is similiar in every respect to the interface means 12 except it includes two larger holes 102 and 104. It has been found that these larger holes provide a smoother flow of rain by permitting air to escape but are still sufficiently small to prevent debris from falling into the rain gauge.

Figure 11:
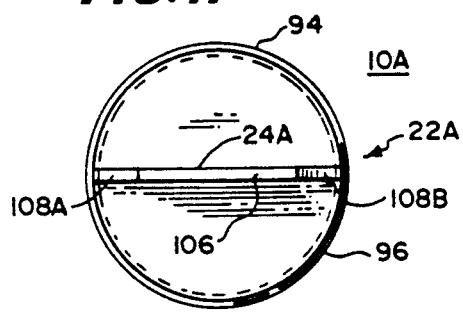
FIG. 11 is a bottom view of another embodiment of rain gauge.

In FIG. 11, there is shown, a bottom view of a rain gauge 10A having the embodiment of plug 22A and showing a relatively flat bottom with the downwardly extending wall 96, the "O" ring 94, and the outwardly extending ear 24A ending slightly short of the wall 96 so as to have a central extending section 106 and two end sections recessed to a level of the "O" ring 94 shown at 108A and 108B.

To construct the rain gauge, the central tube for the container or body means 14 is extruded as a cylinder from butyrate and the closure or plug 22 and blade 24 are injection molded. The bracket 16 is also injection molded from high impact plastic with holes molded in it. The indicia 20 are printed onto the butyrate tube so that the entire assembly can be made inexpensively.

To close the tube with the plug 22, a fixture is inserted to expand or flair the end outwardly. It may also be lubricated with soap and water. The plug 22 is inserted and pressed upwardly into the tube for a press fit with the "O" ring 94 being captured between the shoulder, the tube wall and the plug for sealing. It returns to its original shape by memory.

To use the rain gauge, the bracket 16 is mounted by means of self-tapping wood screws or strapped to a fence with its bottom supporting end 44 extending outwardly. The rain gauge container or body means 14 is then slipped through the top supporting end 44 with its downwardly extending ear 24 or blade 22 going through a slot so that the printed indicia 20 faces outwardly for easy reading. The interface means 12 is now facing upwardly where it will receive rain.

From the above description, it can be seen that the rain gauge of this invention has several advantages such as: (1) it may be easily read from a distance; and (2) it is simple in construction and relatively inexpensive.

Although a preferred embodiment of the invention has been described with some particularity, many modifications and variations of the embodiment may be made without deviating from the invention. Therefore, it is to be understood that, within the scope of the appended claims, the invention may be practiced other than as specifically described.

What is claimed is:

1. A rain gauge comprising:
   a central elongated tube;
   indicia extending vertically along the lateral axes of said tube and spaced apart from each other a predetermined distance;
   an interface means mounted to the top of the tube and a closure in the bottom of said tube;
   the interface means having a collecting opening for receiving rain water;
   said collecting opening having an area which is larger than the area of at least a portion of the tube by a factor equal to a unit of rainfall indicated in the indicia at the location of the diameter of the tube divided by the factor;
   said interface means being a funnel shaped collector communicating with the top of the tube whereby rain may flow from the collector into the tube;
   said interface means including an open top portion of sufficient size to hold substantial water, a horizontal plate having holes in it through which the water may flow into the tube and a bottom portion fitting within the tube and forming a sealing relation therein, said holes being sufficiently small so as to avoid debris falling into the tube and being less than ½ inch in diameter; said funnel shaped collector being capable of holding at least two cubic inches of water.

2. A rain gauge according to claim 1 in which the rain gauge includes a transparent tubular holding portion with a closure at the bottom end adapted to be inserted therein.

3. A rain gauge according to claim 2 further including a bracket;
   said bracket having means for fastening it to a surface;
   a holder on the top of the bracket adapted to receive the body of said rain gauge;
   a supporting surface on the bottom of the racket.

4. A rain gauge according to claim 3 in which one of the bracket or the closure includes an opening and the other an aligning ear, the opening and the aligning ear being adapted to fit within each other, said indicia being positioned with respect to the aligning ear and opening whereby the indicia are automatically aligned outward.

5. A rain gauge comprising:
   a central elongated tube;
   indicia extending vertically along the lateral axes of said tube and spaced apart from each other a predetermined distance;
   an interface means mounted to the top of the tube and a closure in the bottom of said tube;
   the interface means having a collecting opening for receiving rain water;
   said collecting opening having an area which is larger than the area of at least a portion of the tube by a factor equal to a unit of rainfall indicated in the indicia at the location of the diameter of the tube divided by the factor;
   said interface means including an open top portion of sufficient size to hold substantial water, a horizontal plate having holes in it through which the water may flow into the tube and a bottom portion fitting within the tube and forming a sealing relation therein, said holes being sufficiently small so as to avoid debris falling into the tube and being less than ½ inch in diameter; said funnel shaped collector being capable of holding at least two cubic inches of water.

6. A rain gauge according to claim 5 in which the rain gauge includes a transparent tubular holding portion with a closure at the bottom end adapted to be inserted therein.

7. A rain gauge according to claim 6 further including a bracket;
   said bracket having means for fastening it to a surface;
   a holder on the top of the bracket adapted to receive the body of said rain gauge;
   a supporting surface on the bottom of the bracket.

8. A rain gauge according to claim 7 in which one of the bracket or the closure includes an opening and the other an aligning ear, the opening and the aligning ear being adapted to fit within each other, said indicia being positioned with respect to the aligning ear and opening whereby the indicia are automatically aligned outward.

9. A rain gauge according to claim 8 in which said indicia are printed at least ¼ inch in height and at least 3/16 inch in width with the lines forming the individual indicia being at least 1/16 inch wide to provide clear visibility, wherein the indicia can be read from a distance of at least 100 feet by a person with 20/20 vision.

10. A rain gauge in accordance with claim 5 in which at least one of the holes is larger than the remaining holes but is sufficiently small to prevent debris from falling into the rain gauge.

11. A rain gauge in accordance with claim 5 in which at least one of the holes is sufficiently large to allow air to escape but is sufficiently small to prevent debris from falling into the rain gauge.

12. A rain gauge comprising:
    a central elongated tube;
    indicia extending vertically along the lateral axes of said tube and spaced apart from each other a predetermined distance;
    an interface means mounted to the top of the tube and a closure in the bottom of said tube;
    the interface means having a collecting opening for receiving rain water;
    said collecting opening having an area which is larger than the area of at least a portion of the tube by a factor equal to a unit of rainfall indicated in the indicia at the location of the diameter of the tube divided by the factor;
    said indicia being printed at least ¼ inch in height and at least 3/16 inch in width with the lines forming the individual indicia being at least 1/16 inch wide to provide clear visibility, wherein the indicia can be read from a distance of at least 100 feet by a person with 20/20 vision.

13. A rain gauge comprising:
    a central elongated tube;
    indicia extending vertically along the lateral axes of said tube and spaced apart from each other a predetermined distance;

an interface means mounted to the top of the tube and a closure in the bottom of said tube;

the interface means having a collecting opening for receiving rain water;

said collecting opening having an area which is larger than the area of at least a portion of the tube by a factor equal to a unit of rainfall indicated in the indicia at the location of the diameter of the tube divided by the factor;

said rain gauge including a transparent tubular holding portion with a closure at the bottom end adapted to be inserted therein.

14. A rain gauge according to claim 13 further including a bracket;

said bracket having means for fastening it to a surface;

a holder on the top of the bracket adapted to receive the body of said rain gauge;

a supporting surface on the bottom of the bracket.

15. A rain gauge according to claim 14 in which one of the bracket or the closure includes an opening and the other an aligning ear, the opening and the aligning ear being adapted to fit within each other, said indicia being positioned with respect to the aligning ear and opening whereby the indicia are automatically aligned outward.

16. A rain gauge according to claim 13 in which said indicia are printed at least ¼ inch in height and at least 3/16 inch in width with the lines forming the individual indicia being at least 1/16 inch wide to provide clear visibility, wherein the indicia can be read from a distance of at least 100 feet by a person with 20/20 vision.

17. A method of making a rain gauge comprising the steps of;

extruding a transparent plastic tube;

printing on the wall of the tube indicia of rain in inches spaced at distances from each other larger than the actual inches indicated by the indicia;

molding a closure at one end sized to fit and close the tube;

injection molding a top funnel member to fit in the top of the tube having an opening larger than the inner diameter of the tube.

18. A method according to claim 17 wherein the parts are assembled and the rain gauge mounted by a bracket to a surface in an upright position.

19. A method according to claim 17 in which the indicia are printed at least ¼ inch in height and at least 3/16 inch in width with the lines forming the individual indicia being at least 1/16 inch wide to provide clear visibility, wherein the indicia can be read from a distance of at least 100 feet by a person with 20/20 vision.

20. A method according to claim 17 in which the indicia are printed at least ¼ inch in height and at least 3/16 inch in width with the lines forming the individual indicia being at least 1/16 inch wide to provide clear visibility, wherein the indicia can be read from a distance of at least 100 feet by a person with 20/20 vision.

* * * * *